(12) United States Patent
Watanabe et al.

(10) Patent No.: US 6,612,751 B1
(45) Date of Patent: Sep. 2, 2003

(54) OPTICAL REPEATING DEVICE WITH MONITORING FUNCTION

(75) Inventors: Katsumi Watanabe, Aomori (JP); Fumika Kawahara, Aomori (JP); Takayuki Okawa, Tokyo (JP)

(73) Assignees: Tohoku Electric Power Co., Inc., Miyagi (JP); Sankosha Corporation, Tokyo (JP)

( * ) Notice: Subject to any disclaimer, the term of this patent is extended or adjusted under 35 U.S.C. 154(b) by 0 days.

(21) Appl. No.: 09/537,171

(22) Filed: Mar. 29, 2000

(30) Foreign Application Priority Data

Mar. 31, 1999 (JP) .......................... 11-091897

(51) Int. Cl.⁷ .............................. G02B 6/26; G02B 6/42
(52) U.S. Cl. ............................ 385/88; 385/48; 385/47; 385/44
(58) Field of Search ...................... 385/44–48, 88–94, 385/50–52, 15, 73

(56) References Cited

U.S. PATENT DOCUMENTS

| | | | | |
|---|---|---|---|---|
| 4,165,496 A | * | 8/1979 | Di Domenico et al. | 372/31 |
| 4,284,449 A | * | 8/1981 | Stone | 156/86 |
| 4,439,005 A | * | 3/1984 | Winzer | 385/48 |
| 4,564,260 A | * | 1/1986 | Dirmeyer et al. | 385/44 |
| 4,881,789 A | * | 11/1989 | Levinson | 385/48 |

FOREIGN PATENT DOCUMENTS

| | | | | |
|---|---|---|---|---|
| JP | 59038710 A | * | 3/1984 | G02B/7/26 |
| JP | 63102421 A | * | 5/1988 | H04B/9/00 |
| JP | 3-600900 | | 9/1991 | |
| JP | 04355415 A | * | 12/1992 | G02B/6/28 |
| JP | 2586555 | | 10/1998 | |
| WO | WO 9106883 | * | 5/1991 | G02B/6/42 |

* cited by examiner

Primary Examiner—Hemang Sanghavi
Assistant Examiner—Scott A. Knauss
(74) Attorney, Agent, or Firm—Dickstein Shapiro Morin & Oshinsky LLP

(57) ABSTRACT

An optical repeating device with a monitoring function comprises first optical propagation means for propagating a lightwave signal through an optical transmission line, second optical propagation means butted against the first optical propagation means, for propagating the lightwave signal, optical branching means provided on a butting face between the first optical propagation means, and the second optical propagation means, and photodetection means. All the means described are assembled into a housing, and integrated therewith. Consequently, it is possible to downsize the optical repeating device with the monitoring function. A large portion of the lightwave signal propagated between the first optical propagation means and the second optical propagation means is allowed to pass through the optical branching means, however, a portion of the lightwave signal is reflected in a given direction by the optical branching means. A lightwave signal reflected is detected by the photodetection means, and is converted into an electric signal. When the electric signal as converted is displayed by, for example, display means, it is possible to check visually whether or not the lightwave signal is transmitted through the optical transmission line.

5 Claims, 2 Drawing Sheets

OPTICAL REPEATING DEVICE WITH MONITORING FUNCTION

BACKGROUND OF THE INVENTION

1. Field of the Invention

The present invention relates to an optical repeating device with a monitoring function to be inserted in an optical transmission line such as optical fibers, and so forth for detecting lightwave signals being transmitted through the optical transmission line.

2. Description of the Related Art

Conventional technologies in this field have been described in, for example, the following documents.
Document 1: Japanese Patent Publication No. H3-60090;
Title of the Invention; Optical Connector
Publication Date; Sep. 12, 1991
Document 2: Japanese Utility Model Registration No. 2586555;
Title of the Invention; Optical Demultiplexer-Multiplexer
Registration Date; Oct. 2, 1998

A technology related to an optical connector for connecting two lengths of optical fibers with each other is described in Document 1. The optical connector comprises a pair of ferrules, each attached to the tip of the respective lengths of the optical fibers to be connected with each other and having a part to be grasped, a guide member for causing the pair of the ferrules to be inserted, therethrough and secured thereby by moving the same in the direction of a coupling axis, and for aligning the core axes of the both lengths of the optical fibers with each other, and a housing for securely holding the pair of the ferrules, formed independently from the guide member. The housing for securely holding the pair of the ferrules is formed of a metal sheet of uniform thickness, having a bottom portion which is a flat section, and a grasping part having elasticity, vertically upstanding from the bottom portion at opposite ends thereof, respectively, and the respective grasping parts are provided with a groove into which the pair of the ferrules inserted through the guide member are fitted, respectively. When the pair of the ferrules are fitted into the respective grooves, the respective grasping parts and the bottom portion undergo deformation in an arched shape, whereupon an elastic force developed presses the respective parts to be grasped such that the pair of the ferrules are butted against each other in the direction of the respective core axes by the agency of the respective grasping parts.

With the optical connector as described in Document 1, since it is constructed such that coated optical fibers are connected with each other in a condition wherein the same are butted against each other in the direction of the respective core axes by simply fitting the pair of the ferrules inserted through a sleeve into the housing for securely holding the pair of the ferrules, it is possible to downsize the optical connector, and further to facilitate assembling and disassembling of the optical connector. Further, since the sleeve and the housing for securely holding the pair of the ferrules are formed independently from each other, it is possible to align satisfactorily the core axes of the coated optical fibers with each other by the sleeve without being affected by other external forces.

Now a technology related to an optical demultiplexer-multiplexer with a filter block mounted in a case thereof is described in Document 2. With the optical demultiplexer-multiplexer, the filter block is mounted on a single island-like portion of a mounting surface of the case, formed by cutting a groove around the periphery thereof, and having a surface area smaller than that of the bottom of the filter block.

With the optical demultiplexer-multiplexer according to Document 2, since the single island-like portion for mounting the filter block thereon is formed on the mounting surface of the case by cutting the groove around the periphery thereof, the island-like portion constituted as a fixture mount for the filter block is simple in structure, and also, can be formed with ease. Further, as the filter block is mounted on the island-like portion having the surface area smaller than that of the bottom of the filter block, high stability in performance of the optical demultiplexer-multiplexer against variation in temperature is obtained.

In the past, there have been used an optical repeating device for detecting whether or not lightwave signals are transmitted through an optical transmission line, comprising in combination, for example, an optical branch, optical fibers, photo diode (referred to hereinafter as PD), light emitting diode (referred to hereinafter as LED), and so forth. In this connection, the optical branch is to branch off a portion of a lightwave signal being transmitted through the optical transmission line by use of a half mirror, and so forth, and is made up using technologies such as the technology described in Document 2. Then, a lightwave signal, branched off by the optical branch, is taken into the optical fibers, and the lightwave signal, taken into the optical fibers, is converted into an electric signal by the PD. The electric signal as converted is displayed as a visible signal by the LED. As a result, it has been possible to detect whether or not the lightwave signal is transmitted through the optical transmission line by visually watching such a display.

However, with the conventional optical repeating device, the following problems have been encountered.

That is, since the conventional optical repeating device comprises in combination a plurality of optical devices such as the optical branches, PDs, and so forth, there is a tendency of the number of devices increasing while requiring the optical connector, and so forth, made up using the technology described in Document 1, and the like for connecting these devices with each other Consequently, it has been difficult to achieve downsizing of the optical repeating device.

SUMMARY OF THE INVENTION

It is therefore a first object of the invention to simplify and downsize the construction of a housing by providing optical branching means for branching off, and reflecting a portion of a lightwave signal propagating through first optical propagation means and second optical propagation means in a given direction, and by disposing photodetection means such as PDs on the optical axis of the lightwave signal reflected, and also to provide an optical repeating device with a monitoring function, wherein the first optical propagation means, second optical propagation means, photodetection means, and so forth are assembled into the housing, and integrated therewith, so that needs for connecting devices such as optical connectors are eliminated, thereby enabling a whole structure to be simplified and downsized.

A second object of the invention is to provide an optical repeating device with a monitoring function, wherein the first optical propagation means and the second optical propagation means are made up of a relaying optical fiber, and a ferrule formed of a transmissive member for covering the periphery of the relaying optical fiber for protection, respectively, so that the lightwave signal reflected by the optical branching means is allowed to pass through the ferrule formed of the transmissive member so as to be guided with ease to the photodetection means.

A third object of the invention is to provide an optical repeating device with a monitoring function, wherein the optical branching means are made up by forming a metallic film or a multi-layered dielectric coating on respective branching faces of the first optical propagation means and the second optical propagation means by vapor deposition, so that assembling and adjustment work to be performed when joining the first optical propagation means and the second optical propagation means together can be simplified.

A fourth object of the invention is to provide an optical repeating device with a monitoring function, wherein the optical branching means for reflecting a portion of the lightwave signal propagated from the first optical propagation means in a first direction relative to the optical axis of the lightwave signal, and for reflecting a portion of the lightwave signal propagated from the second optical propagation means in a second direction, opposite from the first direction, are provided, so that lightwave signals transmitted through an optical transmission line can be detected by direction by adopting a constitution such that the lightwave signal can be taken out by direction through the optical branching means.

A fifth object of the invention is to provide an optical repeating device with a monitoring function, wherein display means for displaying in a visible condition whether or not a lightwave signal is present are provided, thereby enabling whether or not the lightwave signal is present to be checked with ease.

A sixth object of the invention is to provide an optical repeating device with a monitoring function, wherein the photodetection means can be disposed with ease by forming first and second branching faces to be inclined at angle of, for example, 45 degrees relative to the optical axis of the lightwave signal, and by reflecting a portion of the lightwave signal, branched off, in the orthogonal direction, so that the construction of the housing can be simplified and downsized.

To this end, in accordance with a first aspect of the invention, there is provided an optical repeating device with a monitoring functional comprising first optical propagation means having a first end face for connection with a first optical fiber among the first optical fiber and a second optical fiber, constituting an optical transmission line, and a first branching face formed at a predetermined angle relative to the optical axis of a lightwave signal for branching the lightwave signal transmitted from the first optical fiber, second optical propagation means having a second end face for connection with the second optical fiber of the optical transmission line, and a second branching face formed at the predetermined angle against the optical axis of a lightwave signal for branching the lightwave signal transmitted from the second optical fiber, optical branching means provided between the first branching face of the first optical propagation means, and the second branching face of the second optical propagation means, in intimate contact with each other, for allowing a large portion of the lightwave signal propagated between the first optical propagation means and the second optical propagation means to pass therethrough while reflecting a portion of the lightwave signal in a given direction relative to the optical axis of the lightwave signal, photodetection means for detecting a lightwave signal reflected by the optical branching means, and outputting an electric signal at a level corresponding to intensity of the lightwave signal, and a housing for housing therein the first optical propagation means, the second optical propagation means, the optical branching means, and the photodetection means at predetermined positions to be securely held thereto.

With these features, the optical repeating device with the monitoring function according to the invention may have a constitution such that the first optical propagation means are made up of a first relaying optical fiber for relaying a lightwave signal between the first end face for connection with the first optical fiber and the first branching face, and a first ferrule formed of a transmissive tubular member for securely holding the first relaying optical fiber to a predetermined position therein for protection (that is, covering the periphery of the first relaying optical fiber for protection) while the second optical propagation means are made up of a second relaying optical fiber for relaying a lightwave signal between the second end face for connection with the second optical fiber and the second branching face, and a second ferrule formed of a transmissive tubular member for securely holding the second relaying optical fiber to a predetermined position therein for protection (that is, covering the periphery of the second relaying optical fiber for protection).

Further, in addition to any of these features described above, the optical branching means may be made up by forming a metallic film or a multi-layered dielectric coating on the respective branching faces of the first optical propagation means and the second optical propagation means by vapor deposition.

With the optical repeating device with the monitoring function according to the invention, constituted as described in the foregoing, a large portion of a lightwave signal inputted from the first optical fiber of the optical transmission line to the first end face of the first optical propagation means comprising the relaying optical fiber protected by, for example, the ferrule is propagated from the first branching face of the first optical propagation means to the second branching face of the second optical propagation means via the optical branching means, and is then outputted from the second end face of the second optical propagation means to the second optical fiber. At this point in time, a portion of the lightwave signal inputted to the first end face of the first optical propagation means is branched off by the optical branching means, for example, the metallic film formed on the first branching face by vapor deposition, and is reflected in a given direction relative to the optical axis of the lightwave signal. The lightwave signal reflected by the optical branching means is detected by the photodetection means, and an electric signal at a level corresponding to intensity of the lightwave signal is outputted.

Preferably, the optical branching means are set to allow a large portion of the lightwave signal propagated to the first optical propagation means and the second optical propagation means, respectively, to pass therethrough while reflecting a portion of the lightwave signal propagated from the first optical propagation means in a first direction, and reflecting a portion of the lightwave signal propagated from the second optical propagation means in a second direction, opposite from the first direction.

With the invention constituted as above, a large portion of the lightwave signal inputted to the first end face of the first optical propagation means is propagated from the first branching face of the first optical propagation means to the second branching face of the second optical propagation means via the optical branching means, and is then outputted from the second end face of the second optical propagation means to the second optical fiber. At this point in time, a portion of the lightwave signal inputted to the first end face is reflected in the first direction by the optical branching means. Meanwhile, a large portion of the lightwave signal inputted from the second optical fiber of the optical transmission line to the second end face of the second optical propagation means is propagated from the second branching face of the second optical propagation means to the first branching face of the first optical propagation means via the optical branching means, and is then outputted from the first end face of the first optical propagation means to the first optical fiber. At this point in time, a portion of the lightwave signal inputted to the second end face is reflected in the second direction by the optical branching means. The lightwave signals reflected in the first and second directions, respectively, are detected by the photodetection means, and electric signals at levels corresponding to intensity of the respective lightwave signals are outputted.

Further, in addition to any of those features described in the foregoing, the optical repeating device with the monitoring function according to the invention may be provided with display means securely held to the housing to display in a visible condition whether or not the lightwave signal is transmitted through the optical transmission line on the basis of the electric signal outputted from the photodetection means. As a result, the electric signal outputted from the photodetection means is provided with the display means, so that whether or not the lightwave signal is present in the optical transmission line can be displayed in a visible condition.

Still further, with the optical repeating device with the monitoring function according to the invention, having any of the features described in the foregoing, the first branching face of the first optical propagation means, and the second branching face of the second optical propagation means are preferably formed so as to form an angle of 45 degrees relative to the optical axis of the lightwave signal. As a result, the lightwave signal is reflected in the direction orthogonal to the optical axis to be branched.

These and other objects, and novel features of the invention will be more clearly understood by following detailed description by reference to the accompanying drawings. It is to be understood however that the drawings are for reference only, and the scope of the invention is not limited thereby.

DESCRIPTION OF THE PREFERRED
EMBODIMENTS OF THE INVENTION

Figure 1:
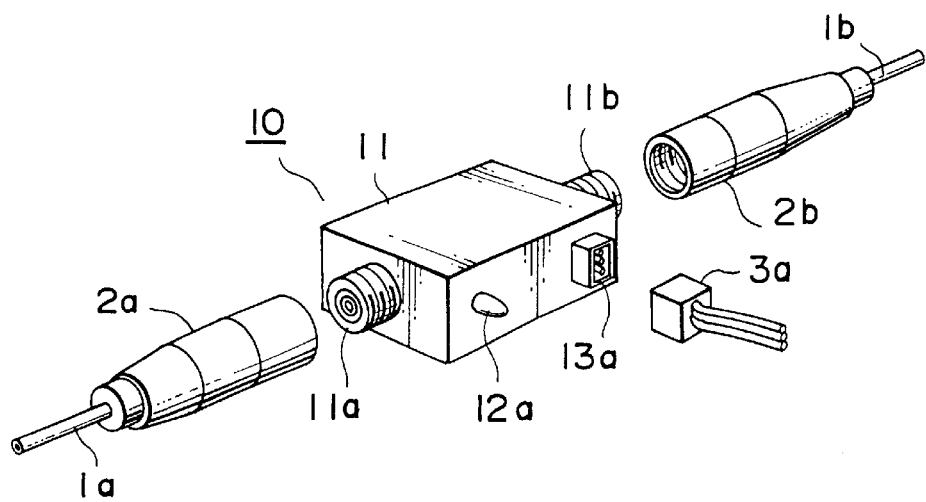
FIG. 1 is a perspective view of a first embodiment of an optical repeating device with a monitoring function according to the invention.
Figure 2:
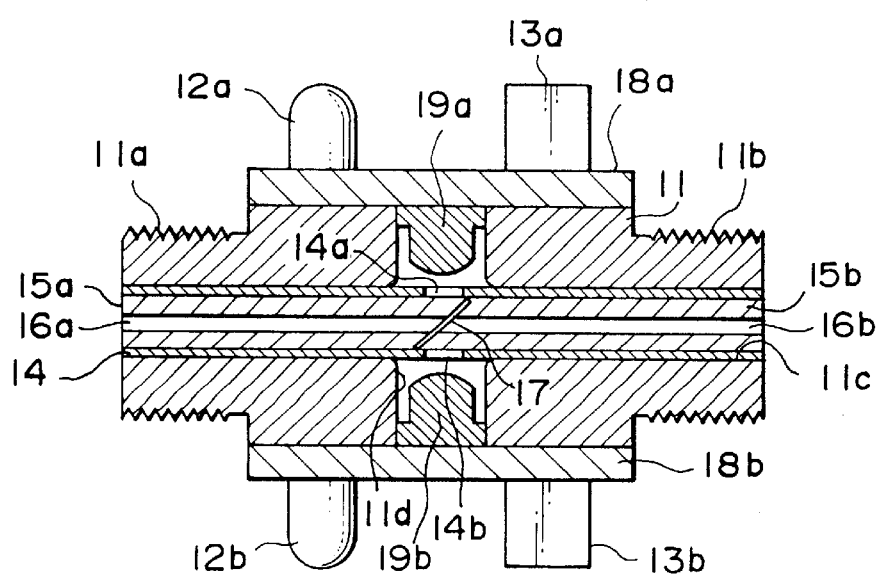
FIG. 2 is an enlarged transverse sectional view of the optical repeating device with the monitoring function as shown in FIG. 1.

First Embodiment (FIGS. 1 and 2)

As shown in FIG. 1, an optical repeating device 10 with a monitoring function is a device adapted to one communication line, and is assembled into, and formed integrally with a housing 11 of a transmissive type, having precise— and rugged-build, formed of precise and substantial material such as engineering plastics, and the like by, for example, die casting. The housing 11 is provided with a connection 11a for connection with an optical connector 2a on the side of an optical fiber 1a, and a connection 11b for connection with an optical connector 2b on the side of an optical fiber 1b, which are formed at opposite end faces thereof, respectively, so as to be inserted between the optical fibers 1a, 1b for transmitting a lightwave signal, that is, the object to be detected. These connections 11a, 11b are disposed in a line, and are, for example, 10 mm in diameter, having a threaded structure up to a predetermined length, so as to match with the coupling type of the optical connectors 2a, 2b.

The optical repeating device 10 with the monitoring function is provided with display means (for example, LEDs) 12a, 12b, and terminals 13a, 13b, disposed on side faces thereof, respectively. The LEDs 12a, 12b display in a visible condition whether or not the lightwave signal is transmitted through the optical transmission line. Further, the terminals 13a, 13b receive electric power supplied from an external electric source, required for detecting the lightwave signal, and output externally a detected signal in the form of an electric signal.

As shown in FIG. 2, a linear bore 11c, for example, 3.5 mm in diameter, is provided between the connections 11a, 11b of the housing 11 such that the center line of the linear bore is in line with the optical axis of the optical fibers 1a, 1b to be connected with the connections 11a, 11b, respectively. Further, the housing 11 is provided with a linear bore 11d in the order of 3 mm in diameter, formed in such a way as to cross the linear bore 11c orthogonally just at the midpoint thereof.

A sleeve 14 having the same length (for example, 30 mm) as that of the linear bore 11c is nestled inside the linear bore 11c interconnecting the connections 11a, 11b. The sleeve 14 is a cylindrical member, made of metal, having an extremely exact and uniform inside diameter, for example, 2.5 mm, and a thickness in the order of 0.5 mm. Windows 14a, 14b, having a diameter, for example, in the order of 1 mm, for guiding a portion of the lightwave signal into the linear bore 11d, are provided at the midpoint of the sleeve 14, corresponding to the position of the linear bore 11d of the housing 11.

First optical propagation means (for example, an optical fiber 16a covered and protected by a ferrule 15a) and second optical propagation means (for example, an optical fiber 16b covered and protected by a ferrule 15b) are inserted into the sleeve 14 from opposite ends thereof, respectively. The ferrules 15a, 15b are tubular members, made of a transmissive material such as glass, and the like, for covering the periphery of the optical fibers 16a, 16b, respectively, to reinforce them, and also for exact alignment thereof. The ferrules 15a, 15b are formed such that the optical fibers 16a, 16b are inserted into the center part of the ferrules 15a, 15b, respectively, to be fixed thereto, and dimensions of the outer shape of the ferrules 15a, 15b, and the position and inside diameter of the bore thereof are determined with high precision so as to lessen coupling losses due to misalignment of the optical fibers 16a, 16b when the ferrules 15a, 15b are inserted into the sleeve 14.

The optical fibers 16a, 16b relay the lightwave signal between the optical fibers 1a, and 1b, and serves as an optical transmission line with low optical losses, formed in the shape of a thin wire, and made of, for example, glass composed primarily of quartz, similarly to the optical fibers 1a and 1b used for optical communication. After the optical fibers 16a, 16b are inserted into the ferrules 15a, 15b, respectively, and fixed thereto with an adhesive or the like, the optical fibers 16a, 16b are ground together with the ferrules 15a, 15b such that branching faces of the optical fibers 16a, 16b, on the branching side thereof, are at an angle of exact 45 degrees. Meanwhile, the end faces of the optical fibers 16a, 16b, on the side of the respective connections, are ground together with the ferrules 15a, 15b so as to form an angle of exact 90 degrees.

The branching faces of the optical fibers 16a, 16b, protected by the ferrules 15a, 15b, respectively, are in surface contact with each other in order to prevent a gap from being formed at the midpoint of the sleeve 14 with optical branching means (for example, a branching film) 17 interposed therebetween. The branching film 17 is made up of, for example, a polyimide film with a metallic film, a multi-layered dielectric coating, or so forth, formed thereon through vapor deposition, and is capable of allowing, a large portion of a lightwave signal to pass therethrough while reflecting a portion of the lightwave signal. The branching faces of the optical fibers 16a, and 16b, together with the ferrules 15a, 15b, are in contact with each other, forming an angle of exact 45 degrees, so that the portion of the lightwave signal transmitted through the optical fibers 16a, and 16b, respectively, is reflected in the orthogonal direction by the branching film 17.

A circuit board 18a with the LED 12a, the terminal 13a, a decision circuit (not shown), and so forth, mounted on the surface thereof, is fixedly attached to the side face of the housing 11, on one side thereof. Photodetection means (for example, a PD) 19a is mounted on the back face of the circuit board 18a so as to be snugly housed inside the bore lid provided in the housing 11. The portion of the lightwave signal transmitted from the optical fiber 16a, reflected by the branching film 17, is caused to pass through the ferrule 15a which is transparent, and the window 14a provided in the sleeve 14, and to fall on the PD 19a. Similarly, a circuit board 18b with the LED 12b, the terminal 13b, and so forth, mounted on the surface thereof, and with the PD 19b mounted on the back face thereof, is fixedly attached to the side face of the housing 11, on the other side thereof. And the portion of the lightwave signal transmitted from the optical fiber 16b, reflected by the branching film 17, is caused to fall on the PD 19b.

Now, with the optical repeating device 10 with the monitoring function as shown in FIGS. 1 and 2, usage and operation thereof are described hereinafter.

First, the optical connectors 2a, 2b of the optical fibers 1a, 1b, respectively, for transmitting a lightwave signal, which is the object to be detected, are connected to the connections 11a, 11b, respectively. Further, connectors 3a, 3b are connected to the terminals 13a, 13b, respectively, and thereby electric power is supplied from an external power source to the circuit boards 18a, 18b, respectively. As a result, the optical repeating device 10 will be ready for detection operation.

When a lightwave signal S1 at a wavelength of $\lambda 1$ is transmitted from the optical fiber 1a toward the optical fiber 1b, the lightwave signal S1 is guided to the branching film 17 after passing through the optical connector 2a and the optical fiber 16a. A large portion of the lightwave signal S1 guided to the branching film 17 passes therethrough and is outputted to the optical fiber 1b via the optical fiber 16b and the optical connector 2b.

A portion S1a of the lightwave signal S1 guided to the branching film 17 is reflected in the orthogonal direction by branching film 17, and falls on the PD 19a after passing through the ferrule 15a which is transparent, and the window 14a provided in the sleeve 14. The lightwave signal S1a falling on the PD 19a is converted into a voltage corresponding to intensity of the lightwave signal S1a, and is outputted to the terminal 13a, whereupon detection on whether or not the lightwave signal S1a is present is made by a decision circuit (not shown) mounted on the circuit board 18a. If a decision is made such that the lightwave signal S1a is present, the LED 12a is lit up by the decision circuit.

With the optical repeating device 10 according to the invention, operation identical to the one described above is performed with respect to a lightwave signal S2 at a wavelength of $\lambda 2$ ($\lambda 2$ being different from $\lambda 1$), transmitted from the optical fiber 1b toward the optical fiber 1a.

More specifically, a lightwave signal S2 at a wavelength of $\lambda 2$, transmitted from the optical fiber 1b toward the optical fiber 1a, is guided to the branching film 17 after passing through the optical connector 2b and the optical fiber 16b. A large portion of the lightwave signal S2 guided to the branching film 17 passes therethrough and is outputted to the optical fiber 1a via the optical fiber 16a and the optical connector 2a, whereupon a portion S2a of the lightwave signal S2 guided to the branching film 17 is reflected in the orthogonal direction by branching film 17, and falls on the PD 19b after passing through the ferrule 15b which is transparent, and the window 14b provided in the sleeve 14. The lightwave signal S2a falling on the PD 19a is converted into a voltage corresponding to intensity of the lightwave signal S2a, and is outputted to the terminal 13b, whereupon detection on whether or not the lightwave signal S2a is present is made by the decision circuit (not shown) mounted on the circuit board 18a. If a decision is made such that the lightwave S2a is present, the LED 12b is lit up by the decision circuit.

Thus, a first embodiment of the optical repeating device 10 according to the invention has advantageous effects as described under items (1) to (6) given below.

(1) The optical fibers 16a, 16b connected with each other with the branching film 17 interjacent therebetween, the PDs 19a, 19b, the LEDs 12a, 12b, and so forth are assembled into the housing 11 to be integrated therewith. Accordingly, a connecting device such as the optical connector as used in the prior art is no longer required, thereby making it possible to simplify the constitution of the optical repeating device, and to reduce the size thereof.

(2) The optical repeating device is provided with the branching film 17 formed at an angle of, for example, 45 degrees relative to the optical axis of a lightwave signal in order to branch off a portion of the lightwave signal transmitted through the optical fibers 16a, 16b. As a result, the portions S1a, S2a of the lightwave signals S1, S2, respectively, are reflected in the orthogonal direction, and by disposing the PDs 19a, 19b on the optical axis of the lightwave signals S1a, S2a, the construction of the housing 11 can be simplified, and downsized.

(3) Since the ferrules 15a, 15b covering the periphery of the optical fibers 16a, 16b, respectively, are formed of a transmissive material such as glass, or so forth, the lightwave signals S1a, S2a, reflected by the branching film 17, can be easily guided to the PDs 19a, 19b.

(4) Since the branching film 17 is set so as to be able to take out the lightwave signals S1a, S2a by direction, it is also possible to detect the lightwave signals S1, S2 in the optical transmission line by direction.

(5) Since the LEDs 12a, 12b for displaying presence of a lightwave signal are provided, it is possible to visually detect with ease whether or not the lightwave signal is present in the optical transmission line without the use of a measuring instrument, or the like.

(6) Since the terminals 13a, 13b for delivering externally output voltage of the PDs 19a, 19b, respectively, are provided, it is possible to monitor with ease conditions of the lightwave signals S1, S2 in the optical transmission line without adversely affecting the communication line by electrically connecting a measuring instrument disposed externally and so forth to the terminals 13a, 13b.

Figure 3:
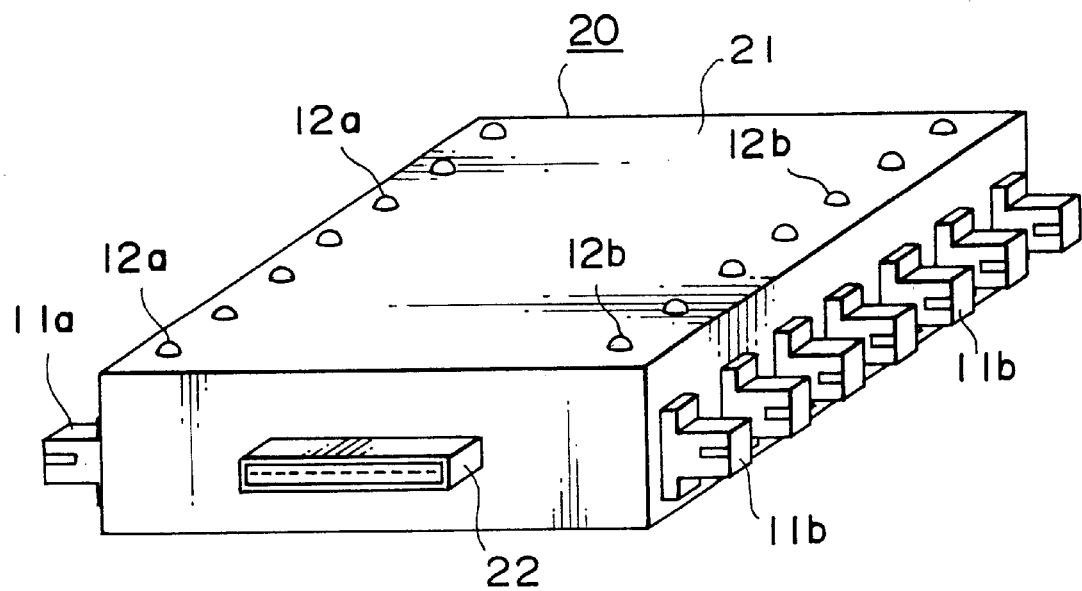
FIG. 3 is a perspective view of a second embodiment of an optical repeating device with a monitoring function according to the invention.

Second Embodiment (FIG. 3)

With a second embodiment of an optical repeating device 20 with a monitoring function according to the invention as shown FIG. 3, parts in common with those in FIGS. 1 and 2, showing the first embodiment of the invention, are denoted by common reference numerals.

The optical repeating device 20 with the monitoring function, shown in FIG. 3, is a device adapted to a plurality of communication lines, and a plurality of the optical repeating device 10 with the monitoring function, as shown in FIGS. 1 and 2, are placed in parallel with each other, and are housed in one cabinet 21. A plurality of connections 11a, 11b of fit-in type, corresponding to the plurality of communication lines, are attached to side faces of the cabinet 21, on opposite sides, respectively. The upper surface of the cabinet 21 is provided with a plurality of LEDs 12a, 12b, and another side face of the cabinet 21 is provided with a common connector 22 for supplying electric power from a power source, and monitoring lightwave signals. The common connector 22 is electrically connected to a plurality of terminals 13a, 13b, as shown in FIGS. 1 and 2, which are housed inside the cabinet 21.

With the optical repeating device 20 with the monitoring function, shown in FIG. 3, the substantially same operation as that for the first embodiment can be performed with respect to each of the communication lines, and the substantially same advantageous effects can be obtained. Particularly, the second embodiment of the invention has advantageous effects in that the device adapted to the plurality of communication lines can be rendered smaller in size and installation, measurement, so forth can be executed efficiently.

It is to be understood that the scope of the invention is not limited to the embodiments described above, and various changes and modifications may be made in the invention without departing from the spirit and scope thereof. For example, modifications described under items (a) to (j) given below can be cited.

(a) The constituent material of the housing 11 is not limited to engineering plastics. A metal such as aluminum, and so forth may be used for the housing 11.

(b) The coupling type of the connections 11a, 11b is not limited to the screw-in type or the fit-in type. For example, a bayonet-lock type, a simple push-in type, or so forth may be used so as to match with the coupling type of the optical connectors 2a, 2b.

(c) For the branching film 17, the polyimide film with the multi-layered dielectric coating or so forth, formed thereon by vapor deposition, is used, however, a metallic film, a multi-layered dielectrics coating, or so forth may be formed directly on ground faces of the optical fibers 16a, 16b and the ferrules 15a, 15b through vapor deposition. This will enable assembling and adjustment work to be performed when joining the optical fibers 16a, 16b together to be simplified.

(d) The sleeve 14 for inserting the optical fibers 16a, and so forth therein so as to align the optical axes thereof with each other is nestled in the bore 11c provided in the housing 11, however, if the bore 11c can be formed with high precision by use of engineering plastics, and so forth, the sleeve 14 may be dispensed with. This will contribute to further simplification in constitution.

(e) For the optical fibers 16a, 16b, thin optical fibers, made of glass, which are the same as ones used for optical communication, are used, and the peripheries thereof are covered with the ferrules 15a, 15b, respectively, for protection. However, in this case, flexibility is not required and transmission losses are insignificant, and therefore, for example, thick plastic fibers or the like may be used instead so as to be inserted directly into the sleeve 14 without the use of the ferrules 15a, 15b. Further, if the bore 11c of the housing 11 can be formed with high precision, plastic fibers or the like may be inserted directly into the bore 11c without the use of the sleeve 14. This will contribute to still further simplification in constitution.

(f) In place of the PDs 19a, 19b, photo detectors such as photo transistors or the like may be used.

(g) In case there is no need of delivering externally the output voltage of the PDs 19a, 19b, the terminals 13a, 13b may be used just to receive supply of electric power from the external power source.

(h) With this embodiment, the arrangement is made such that when presence of the lightwave signals S1a, S2a is detected, the LEDs 12a, 12b are lit up, respectively. However, the arrangement may be reversed such that when presence of the lightwave signals S1a, S2a is not detected, the LEDs 12a, 12b are lit up, respectively.

(i) With this embodiment, the lightwave signals S1, S2 transmitted through the optical fibers 1a, 1b, respectively, is detected by direction, and displayed with the use of two LEDs, that is, the LEDs 12a, 12b. However, in case of applying the invention to optical transmission in a single direction, the arrangement may be made such that either the lightwave signal S1 or the lightwave signal S2 only in the direction of transmission is detected and displayed.

(j) The branching faces of the optical fibers 16a, 16b, are ground together with those of the ferrules 15a, 15b, respectively, to be inclined at an angle of, for example, 45 degrees. However, the angle may not necessarily be 45 degrees, and a suitable angle of, for example, 30 degrees may be formed depending on the structure of the housing 11, and a way in which the PDs 19a, 19b are mounted.

What is claimed is:

1. An optical repeating device with a monitoring function comprising:

first optical propagation means having a first end face for connection with a first optical fiber among the first optical fiber and a second optical fiber, constituting an optical transmission line, and a first branching face formed at a predetermined angle relative to the optical axis of a lightwave signal for branching the lightwave signal transmitted from the first optical fiber;

second optical propagation means having a second end face for connection with the second optical fiber of the optical transmission line, and a second branching face formed at the predetermined angle against the optical axis of a lightwave signal for branching the lightwave signal transmitted from the second optical fiber;

optical branching means provided between the first branching face of the first optical propagation means, and the second branching face of the second optical propagation means, in intimate contact with each other, for allowing a large portion of the lightwave signal propagated between the first optical propagation means and the second optical propagation means to pass therethrough while reflecting a portion of the lightwave signal in a given direction relative to the optical axis of the lightwave signal;

photodetection means for detecting a lightwave signal reflected by the optical branching means, and outputting an electric signal at a level corresponding to intensity of the lightwave signal;

display means for displaying in a visible condition whether or not the lightwave signal is transmitted through the optical transmission line on the basis of the electric signal outputted from the photodetection means; and a housing for housing therein the first optical propagation means, the second optical propagation means, the optical branching means, the photodetection means, and the display means at predetermined positions to be securely held thereto.

2. An optical repeating device with a monitoring function comprising:

first optical propagation means having a first end face for connection with a first optical fiber among the first optical fiber and a second optical fiber, constituting an optical transmission line, and a first branching face formed at a predetermined angle relative to the optical axis of a lightwave signal for branching the lightwave signal transmitted from the first optical fiber;

second optical propagation means having a second end face for connection with the second optical fiber of the optical transmission line, and a second branching face formed at the predetermined angle against the optical axis of a lightwave signal for branching the lightwave signal transmitted from the second optical fiber;

optical branching means provided between the first branching face of the first optical propagation means, and the second branching face of the second optical propagation means, said branching means formed by a metallic film or a multi-layered dielectric coating on the respective branching faces of the first optical propagation means and the second optical propagation means, in intimate contact with each other, for allowing a large portion of the lightwave signal propagated between the first optical propagation means and the second optical propagation means to pass therethrough while reflecting a portion of the lightwave signal in a given direction relative to the optical axis of the lightwave signal;

photodetection means for detecting a lightwave signal reflected by the optical branching means, and outputting an electric signal at a level corresponding to intensity of the lightwave signal;

display means for displaying in a visible condition whether or not the lightwave signal is transmitted through the optical transmission line on the basis of the electric signal outputted from the photodetection means; and a housing for housing therein the first optical propagation means, the second optical propagation means, the optical branching means, the photodetection means, and the display means at predetermined positions to be securely held thereto.

3. An optical repeating device with a monitoring function comprising:

first optical propagation means having a first end face for connection with a first optical fiber among the first optical fiber and a second optical fiber, constituting an optical transmission line, and a first branching face formed at a predetermined angle relative to the optical axis of a lightwave signal for branching the lightwave signal transmitted from the first optical fiber;

second optical propagation means having a second end face for connection with the second optical fiber of the optical transmission line, and a second branching face formed at the predetermined angle against the optical axis of a lightwave signal for branching the lightwave signal transmitted from the second optical fiber;

optical branching means provided between the first branching face of the first optical propagation means, and the second branching face of the second optical propagation means, in intimate contact with each other, for allowing a large portion of the lightwave signal propagated from the first optical propagation means in a first direction, and reflecting a portion of the lightwave signal propagated from the second optical propagation means in a second direction, opposite from the first direction;

photodetection means for detecting a lightwave signal reflected by the optical branching means, and outputting an electric signal at a level corresponding to intensity of the lightwave signal;

display means for displaying in a visible condition whether or not the lightwave signal is transmitted through the optical transmission line on the basis of the electric signal outputted from the photodetection means; and a housing for housing therein the first optical propagation means, the second optical propagation means, the optical branching means, the photodetection means, and the display means at predetermined positions to be securely held thereto.

4. An optical repeating device with a monitoring function according to claim 1 wherein the first branching face of the first optical propagation means, and the second branching face of the second optical propagation means are formed so as to form an angle of 45 degrees relative to the optical axis of the lightwave signal.

5. An optical repeating device with a monitoring function comprising:

first optical propagation means having a first end face for connection with a first optical fiber among the first optical fiber and a second optical fiber, constituting an optical transmission line, and a first branching face formed at a predetermined angle relative to the optical axis of a lightwave signal for branching the lightwave signal transmitted from the first optical fiber, and wherein the first optical propagation means are made up of a first relaying optical fiber for relaying a lightwave signal between the first end face for connection with the first optical fiber and the first branching face, and a first ferrule formed of a transmissive tubular member for securely holding the first relaying optical fiber to a predetermined position therein;

second optical propagation means having a second end face for connection with the second optical fiber of the optical transmission line, and a second branching face formed at the predetermined angle against the optical axis of a lightwave signal for branching the lightwave signal transmitted from the second optical fiber, and wherein the second optical propagation means are made up of a second relaying optical fiber for relaying a lightwave signal between the second end face for connection with the second optical fiber and the second branching face, and a second ferrule formed of a transmissive tubular member for securely holding the second relaying optical fiber to a predetermined position therein;

optical branching means provided between the first branching face of the first optical propagation means, and the second branching face of the second optical propagation means, in intimate contact with each other, for allowing a large portion of the lightwave signal propagated between the first optical propagation means and the second optical propagation means to pass therethrough while reflecting a portion of the lightwave signal in a given direction relative to the optical axis of the lightwave signal;

photodetection means for detecting a lightwave signal reflected by the optical branching means, and outputting an electric signal at a level corresponding to intensity of the lightwave signal;

display means for displaying in a visible condition whether or not the lightwave signal is transmitted through the optical transmission line on the basis of the electric signal outputted from the photodetection means; and a housing for housing therein the first optical propagation means, the second optical propagation means, the optical branching means, the photodetection means, and the display means at predetermined positions to be securely held thereto.

* * * * *